Figure 1:
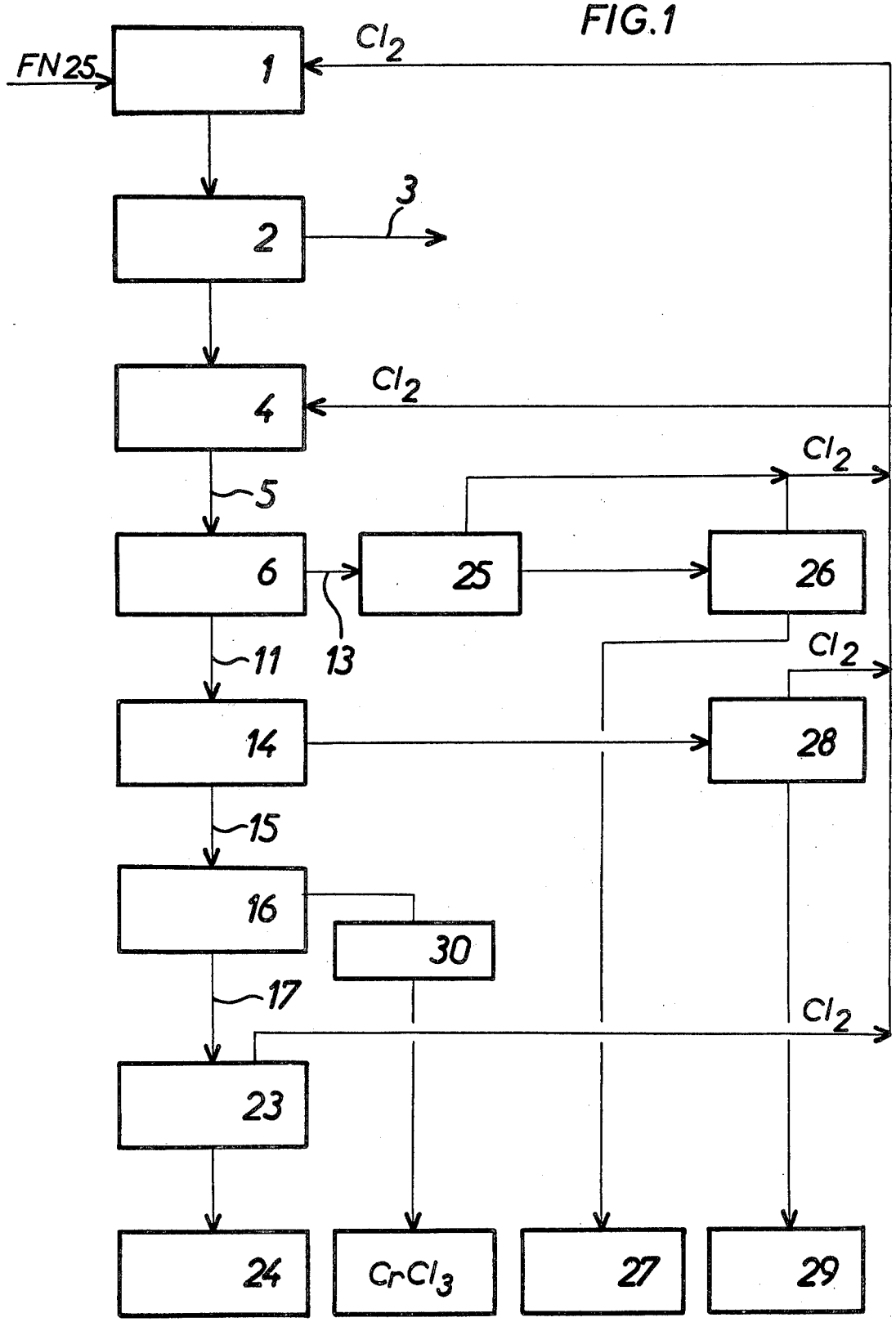

United States Patent [19]

Gandon et al.

[11] 4,016,054

[45] Apr. 5, 1977

[54] HYDROMETALLURGICAL TREATMENT PROCESS FOR EXTRACTING CONSTITUENT METAL VALUES FROM FERRO-NICKEL

[75] Inventors: Louis Gandon, Rambouillet; Jean-Michel Demarthe, Viroflay, both of France

[73] Assignee: Imetal, Paris, France

[22] Filed: July 10, 1975

[21] Appl. No.: 594,812

[30] Foreign Application Priority Data

July 10, 1974   France .............................. 74.24017

[52] U.S. Cl. ...................... 204/105 R; 204/113; 204/128; 75/101 BE; 75/119; 75/121; 423/54; 423/139

[51] Int. Cl.² ...................... C25C 1/08; C25C 1/10; C25G 1/00; C22B 3/00

[58] Field of Search .............. 75/101 BE, 119, 121; 204/113, 128, 105 R; 423/139, 54

[56] References Cited

UNITED STATES PATENTS

| | | | |
|---|---|---|---|
| 3,128,156 | 4/1964 | Long et al. ...................... | 423/139 |
| 3,824,161 | 7/1974 | Aue et al. ........................ | 423/139 |
| 3,887,679 | 6/1975 | Wigstol et al. .................. | 423/139 |
| 3,903,235 | 9/1975 | Cardwell et al. ............. | 75/101 BE |

OTHER PUBLICATIONS

"Extraction of Sb in Tertiary Amines" by Alian et al., Talanta, 1967, vol. 14, pp. 659, 668.

Primary Examiner—R. L. Andrews
Attorney, Agent, or Firm—Fleit & Jacobson

[57] ABSTRACT

The present invention relates to a hydrometallurgical treatment process for extracting, in a pure (elemental) or other valuable (i.e. commercially usable) form, constituent metals from ferro-nickel, that is nickel, cobalt, iron and sometimes chromium.

22 Claims, 3 Drawing Figures

HYDROMETALLURGICAL TREATMENT PROCESS FOR EXTRACTING CONSTITUENT METAL VALUES FROM FERRO-NICKEL

Ferro-nickel is obtained by reductive fusion of oxidized nickel-bearing minerals rich in silica and magnesia. The melt is then subjected to a more or less extensive conversion, so as to eliminate a more or less substantial fraction of the iron. In this manner a whole range of iron-nickel alloys can be obtained which also contain various amounts of diverse impurities such as cobalt, chromium, silicon and carbon. Three types of such alloys employed in industry contain approximately 25, 70 and 90% by weight of nickel and are sometimes designated FN25, FN70 and FN90 respectively. Analyses of these alloys are given in the following Table I.

TABLE I

| % by weight | Fe | Ni | Co | Cr | Si | C |
|---|---|---|---|---|---|---|
| FN 25 | 68–70 | 23–25 | 0.6 | 1.6–1.7 | 3 | 1.6 |
| FN 70 | 28 | 70 | 1.8 | 0.001 | — | — |
| FN 90 | 7–7.5 | 90 | 2–2.5 | 0.001 | — | — |

At present the ferro-nickels are on the market as such, but their composition obviously prevents their utilization for certain applications. Furthermore, the cobalt contained in the ferro-nickel is generally not recovered, in spite of its high commercial value.

It is an object of the present invention therefore to provide a process for the treatment of ferro-nickel by hydrometallurgical techniques, yielding economically and in valuable form the metals (such as cobalt, chromium and iron) contained in the starting ferro-nickel.

It is also an object of the invention to provide a process of this type which may be used, without excessive modifications, for a ferro-nickel of any composition.

The invention accordingly provides a hydrometallurgical treatment process for extracting constituent metal values from ferro-nickel, comprising:

a. treating the ferro-nickel with chlorine in an aqueous medium and filtering the resultant matter, b. oxidising the filtrate, c. removing the iron contained in the oxidised filtrate by liquid/liquid exchange by means of an organic phase (i) containing tributyl phosphate and regenerating the organic phase (i) by means of an aqueous phase (ii) thus yielding a pure aqueous solution of ferric chloride;

d. removing the cobalt contained in the oxidised filtrate by liquid/liquid exchange by means of an organic phase (iii) containing a tertiary amine and regenerating the organic phase (iii) by means of aqueous phase (iv) thus yielding a pure aqueous solution of cobalt chloride; and e. which may be omitted if the ferro-nickel contains negligible chromium, removing the chromium contained in the oxidised filtrate by liquid-liquid exchange by means of an organic phase (v) containing an alkylphosphoric acid and regenerating the organic phase (v) by means of an aqueous phase (vi) thus yielding a pure aqueous solution of chromium chloride; the resultant oxidised filtrate comprising a solution of nickel chloride, and optionally f. treating at least one of the solutions of ferric chloride, cobalt chloride, chromium chloride or nickel chloride so as to obtain the corresponding metal in elemental or other valuable form; and extends to the metals and metal values so extracted. This treatment (f) conveniently comprises, especially for the nickel chloride solution, electrolysis.

The chlorine liberated in the or each electrolysis may, with advantage, be recycled to the treatment (a).

While removal of iron (as in step (c)) by means of tributyl phosphate is known per se, the chloride ions necessary for efficient extraction of the iron have previously been supplied by hydrochloric acid which had to be present in large excess, with inconvenient side-effects, notably on the electrolysis of the solution of nickel chloride to nickel. This (and each other) electrolysis is preferably conducted with the pH of the solution being from 3 to 4. Excess acidity, due to the excess hydrochloric acid, could be eliminated by adding a base such as a nickel or sodium carbonate, which however renders the electrolysis difficult.

Now, in the process in accordance with the invention, the necessary chloride ions are supplied by the nickel chloride itself, which constitutes an important advantage since no foreign ion will be introduced into the solution. However, as the Fe/Ni ratio may be high in the starting ferro-nickel, the concentration of the chloride ions bonded to the nickel should be limited, bearing in mind the solubility of mixtures of ferric chloride and nickel chloride.

Preferably the solution of ferric chloride is subjected to a first electrolysis conducted so as to convert at least part of the ferric chloride to ferrous chloride, and subsequently to a second electrolysis yielding metallic iron.

In accordance with a preferred method of conducting the process according to the invention, this problem can be resolved if the removal (c) of the iron comprises the following stages in succession:

1. contacting the oxidised filtrate from the oxidation (b) with the organic phase (i);
2. concentrating the aqueous phase resulting from the contacting (1);
3. contacting the concentrated aqueous phase from the concentration (2) with the organic phase (i) resulting from the contacting (1);
4. regenerating the organic phase resulting from the contacting (3) by means of the aqueous phase (ii), which is water or acidified water;
5. contacting the aqueous phase from the contacting (3) with the regenerated organic phase from the regeneration (4); and
6. recycling the organic phase to the contacting (1).

The ferric chloride contained in the nickel chloride solution can be removed in the stage (3), which yields an organic phase containing the iron. Upon simple regeneration of the organic phase with water, a quite concentrated ferric chloride solution can result. Furthermore, this method for removing iron specifies a concentration stage (2) which would in any case be almost indispensable before any electrolysis stage. Finally this method allows the consumption of hydrochloric acid to be diminished very considerably.

The solution of nickel chloride, before the step (c), is preferably slightly acidic so as to avoid hydrolysis of the ferric iron. This acidity is not as high as in known processes, being for example of the order of 0.3N for a solution containing 40 g/l of nickel; this small quantity of acid can indeed be eliminated by co-extraction with the iron in the tributyl phosphate. Thus a nickel chloride solution can be obtained directly whose pH is close to 2. The acid accompanying the ferric chloride may be recovered if this chloride is pyrohydrolyzed.

The step (e) of removing chromium is indispensable if the solution resulting at the end of the process set forth above is to be electrolysed in order to obtain pure nickel and contains more than about 5 ppm of chromium on a par with the electrodes, since chromium seriously interferes with the correct operation of the electrolysis. Thus, step (e) is needed before pure nickel can be obtained by electrolysis from, for example, FN25 (described above) as a starting ferro-nickel for the present process.

In a known process, chromium is removed by selective precipitation of chromium hydroxide at a pH near 4, the pH being adjusted by adding nickel carbonate as necessary. This technique, however, necessitates a filtration, the preparation of an excess of carbonate, and a decantation, which makes it cumbersome and, in addition, the operation must be strictly controlled in order to ensure a chromium content of less than 5 ppm.

Hence, in accordance with a preferred method of conducting the process according to the invention, the step (e) for removing chromium, when required, comprises preferably the following stages:

1. contacting the oxidised filtrate with the organic phase (v);
2. washing the organic phase (v) with acidified water;
3. extracting the chromium contained in the organic phase (v) by the aqueous phase (vi), which is concentrated hydrochloric acid;
4. at least partially intermediately salifying the organic phase (v) by means of a basic agent; and
5. contacting the organic phase (v) with a solution of nickel chloride. The basic agent used in stage (4) may be sodium carbonate, and preferably the acidified water used for the washing of the organic phase (v) has an acidity of from 0.1 to 1 N.

By this method, a residual content of chromium of well below 2 ppm can be readily achieved, which constitutes an improvement over known processes, as well as avoiding a filtration operation.

Finally, it should be noted that the chromium present in ferro-nickels with low nickel content may be considered as refinable, since the Cr/Ni ratio may be as high as 6%. The chromium may be separated from the nickel with small nickel losses and a recovery yield of chromium close to 100%.

Figure 2:
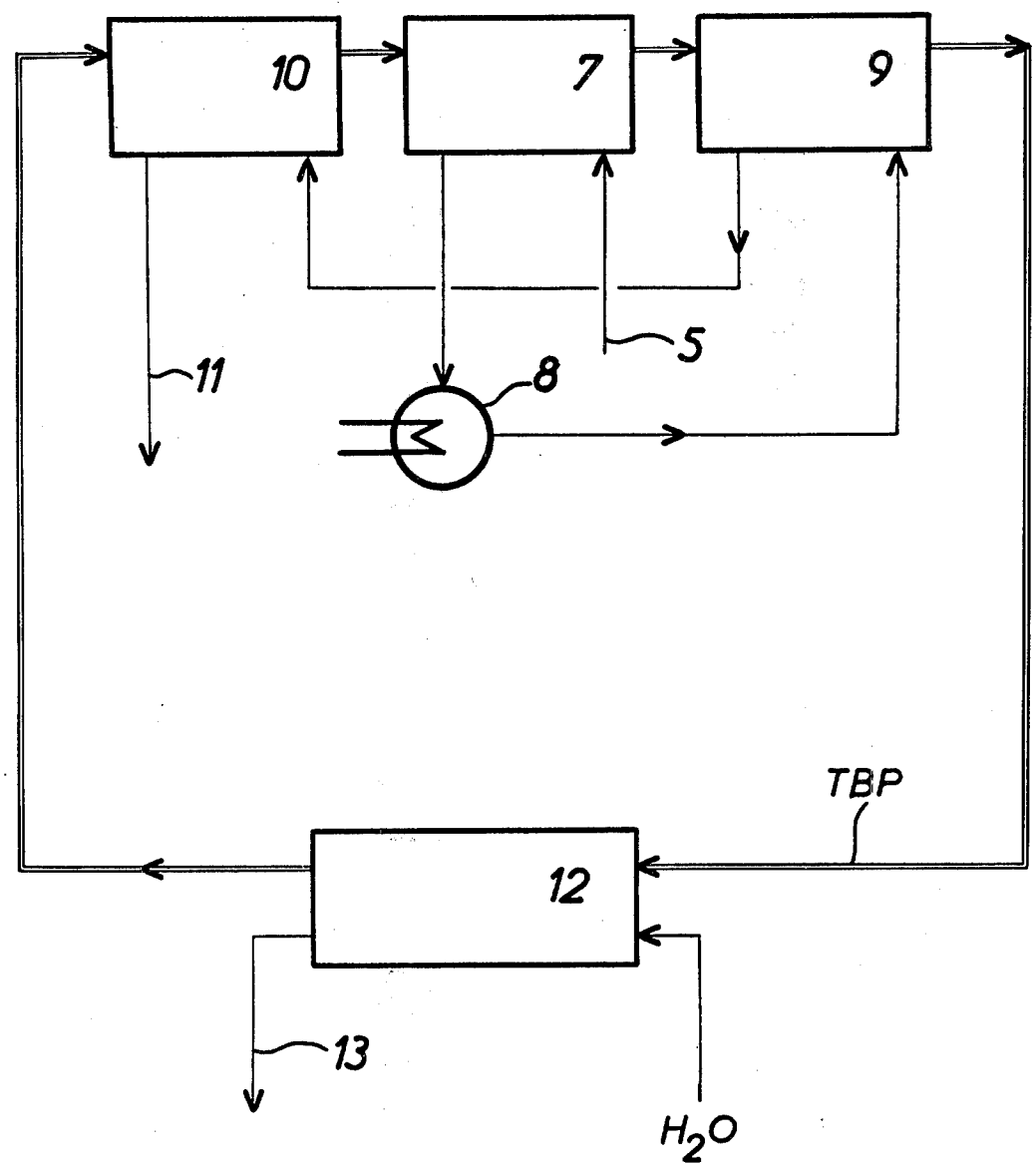
Figure 3:
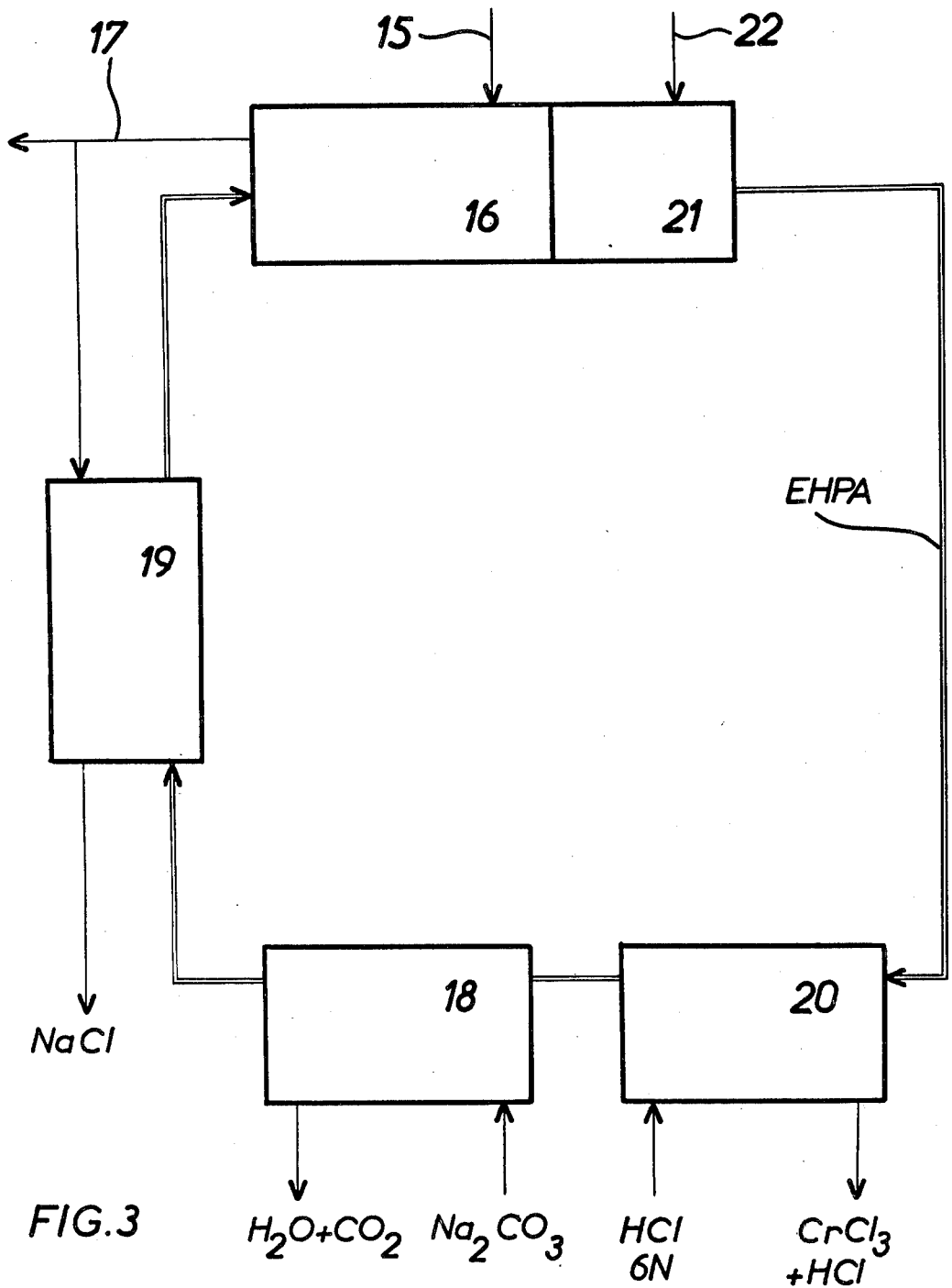

The invention will now be described in more detail, purely by way of example, with reference to the accompanying drawings, in which:

FIG. 1 is a schematic flow-chart showing the main stages of the process in accordance with the invention, and FIGS. 2 and 3 are schematic flow-charts showing details of certain of these main stages.

The ferro-nickel to be treated is in the first place granulated, which is done starting from the molten product and with the help of a strong current of water according to known processes.

The granulated ferro-nickel is subjected to a continuous attack 1 (FIG. 1) is a column-type reactor, by chlorine in the presence of water. The attack 1 is conducted at from 70° C to 110° C (preferably nearer the latter) in such a manner as to produce weakly acid solutions without excess of chlorination agent. The quantitiy of chlorine used is from 1 to 1.1 (preferably 1.05) times the stoichiometrically required quantity for that individual ferro-nickel composition. The attack 1 is carried out so as to result in a solution with a specific density of 1.3 or 1.4, which assures a good speed of filtration at future stages.

The product obtained following the attack 1 is filtered in 2, at a temperature of from 50° to 80° C, leaving a residue 3 which contains impurities such as silicon, carbon, phosphorus and sulphur. The removal so early of these undesirable elements notably simplifies the following operations.

The filtrate from 2 is a chloride solution which is subsequently oxidized at stage 4. In fact the iron contained in this solution is in the ferrous state, and must be converted to ghe ferric state to give the iron a greater propensity to form complexes, which property is used in the subsequent stages.

This oxidation 4 may be done by the addition of oxygenated water (hydrogen peroxide) or by the injection of chlorine. Furthermore, acidification, using hydrochloric acid, is performed on the solution if necessary to ensure an acidity of from 0.1 and 0.5N, so as to avoid any risk of precipitation of ferric hydroxide. In this way a solution 5 is obtained which comprises the chlorides of the metals contained in the starting ferro-nickel (see Table I) which metals are now to be separated.

Firstly, in stage 6, the iron contained in solution 5 is extracted. This stage, an advantageous method of realization of which is specified in FIG. 2, is realized by liquid/liquid extraction by means of an organic phase consisting of tributyl phosphate in an aromatic solvent.

The extraction is carried out in three stages with an intermediate concentration of the solution, so as to take advantage on the one hand of the strong affinity of the tributyl phosphate for ferric iron in chloride medium and, on the other hand, of the salting-out effect of the nickel chloride $NiCl_2$, whilst avoiding the addition of hydrochloric acid and the crystallization of the dissolved salts.

The first of these three stages is the extraction proper, 7: the oxidized crude solution 5 is placed into contact, for example in a battery of mixer-decanters, with the tributyl phosphate solution which is designated TBP in FIG. 2 and the course of which is represented by a double line.

The purified aqueous solution issuing from the extraction 7 is subsequently concentrated by 8 by a factor of about three and placed into contact once more in 9, in counter-current, with the tributyl phosphate deriving from the extraction 7 and which will then be saturated.

Finally, in a third stage 10, the solution issuing from the operation 9 is placed into contact, still in counter-current, with the tributyl phosphate which has been regenerated in 12. The regeneration 12 comprises the placing into contact of the organic phase with water which takes up ferric chloride.

Thus we obtain on the one hand an aqueous solution of ferric chloride 13 which derives from the regeneration stage 12 and, on the other hand, the aqueous solution of chlorides 11 (usually at least 5 moles/1 of chloride ion) freed of iron.

The process is continued with the extraction of cobalt which is represented at 14 in FIG. 1. Beforehand, the nickel content of the solution 11 is raised to a value of the order of 150 g/l which corresponds to a cobalt content of about 4 to 5 g/l, depending on the relative proportions of nickel and of cobalt in the starting ferro-nickel.

The extraction 14 of the cobalt takes place in a single stage by liquid/liquid extraction in counter-current by means of a strongly basic anion liquid exchanger such as triisooctylamine in an aromatic solvent.

This liquid/liquid extraction allows an almost complete separation of the cobalt on the one hand, and of the nickel and chromium on the other hand, yielding a pure solution of cobalt chloride 28, to which we will return later.

The extraction 14 also yields a nickel chloride solution 15 (FIG. 1) purified of iron and cobalt. The solution 15 is subjected subsequently, if necessary, as has been explained earlier, to an operation of chromium extraction 16, the various stages of which, in an advantageous method, are as shown in FIG. 3 and which may be summed up in a liquid/liquid extraction by means of a cation exchanger of one of the family of alkyl-phosphoric acids (at least two-thirds of which acid may be in the form of its nickel salt) such as for example 2-diethyl phosphoric acid. The flow path of this cation exchanger is shown in double lines labelled EHPA on FIG. 3. It is preferably used diluted in a suitable organic solvent.

The whole of the method of FIG. 3, all the stages of which are counter-current contact operations, comprises:

intermediately at least partially salifying, at 18, the cation exchanger by a solution of sodium carbonate;

displacement 19 of the sodium contained in the organic phase by a portion of the solution 17 of nickel chloride purified at the time of the extraction 16;

extraction 16 of the chromium. This extraction takes place at a pH of the order of 3 to 4.3 and consists in fact of an exchange:

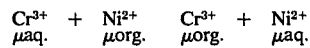

The symbols "$\mu$aq." and "$\mu$org." indicate that the corresponding cations are in aqueous phase or organic phase respectively. The nickel concentration in the resulting purified solution 17 is greater than that in the solution to be treated 15;

washing 21 of the cation exchanger charged with chromium by acidified water 22 at a pH of about 1;

re-extraction 20 of the chromium by about 6N hydrochloric acid. This re-extraction takes place at 60° to 70° C and yields a solution of chromium chloride in the hydrochloric acid; we shall see later how this solution is treated.

The purified solution 17 of nickel chloride is subjected at 23 (FIG. 3) to an electrolysis by a process with insoluble anodes of known type. Thus pure nickel 24 is obtained at the cathode.

The ferric chloride solution 13, deriving from stage 6 (FIG. 1) of the iron extraction, is reduced electrolytically to the ferrous state at 25 before being electrolyzed at 26 according to a process analogous with that used at 23 for the nickel. Pure iron 27 is obtained in this manner, and the chlorine liberated during the electrolyses 23 and 26 may be utilized for attacking at 1 new quantities of ferro-nickel.

The solution of cobalt chloride obtained as described above in stage 14 may also be subjected to an electrolysis 28 with recovery of chlorine, yielding pure cobalt 29.

Finally the hydrochloric acid solution of chromium chloride which derives from the operations 16, 20 (FIG. 3) of chromium extraction may be distilled at 30 to remove the hydrochloric acid, leaving pure chromium chloride 31 of the formula $CrCl_3$. The chloride may be electrolyzed with the other metals, to produce pure chromium metal.

The conversion of a given chloride solution to the corresponding metal may however be realized by non-electrolytic means; for example the solution could be pyrohydrolysed and the oxide obtained could then be reduced.

For the refining of the diverse metals it is, besides, not always necessary to proceed via the metal form. Thus, each of the chlorides, after crystallization, represents the metal in valuable form which may be put on the market as it is, or may be converted to other salts, such as the sulphate.

An example, including numerical data, of practical operation of the process in accordance with the invention now follows:

EXAMPLE

In this example the starting product is a ferro-nickel designated "FN 25", which has the following analysis in per cent by weight:

| Element | Fe | Ni | Co | Cr | Si | C |
| --- | --- | --- | --- | --- | --- | --- |
| Content | 68 | 25 | 0.6 | 1.6 | 3 | 1.6 |

This product is granulated so as to have a mean diameter equal to 0.9 mm and it is attacked (1) by a mixture of steam and gaseous chlorine, at a temperature of 110° C, in a nonpacked column operating in counter-current mode.

In the upper part of the column ferro-nickel is introduced at a rate of 116 g/hour and, in the lower part, the steam/chlorine mixture is admitted at a rate of 64 l of chlorine per hour.

In this way 0.55 l/hour of a solution are obtained, the density of which is 1.35 at 25° C, which proves that its concentration of metal chlorides is close to saturation. After a continuous filtration (2) a solution is obtained, the analysis of which is given in the following Table II.

This Table also indicates the content of each element in the residue (3) together with the efficiency of solubilization.

TABLE II

| Element | Ni | Fe | Cr | Co | H⁺ |
| --- | --- | --- | --- | --- | --- |
| Analysis of Solution (g/l) | 49 | 125 | 3.02 | 1.17 | 0.05N |
| Analysis of Residue (%) | 0.45 | 2.5 | 1.5 | 0.01 | |
| Efficiency of solubilization | 99.9 | 99.8 | 94.5 | 99.9 | |

The oxidation (4) of the solution so obtained is achieved by means of chlorine in a counter-current column. The data of this operation are as follows:

TABLE III

| | |
| --- | --- |
| Flow of solution | 6.45 l/hr |
| Flow of chlorine | 145 l/hr |
| Temperature of reaction region | 60 – 80° C |
| Chlorine yield | > 99.9% |
| Potential of outgoing solution | 1.05 V |

TABLE III-continued

| Duration of contact | 10 mins. |
| --- | --- |

The extraction of the iron (6) from the oxidized filtrate (5) is performed as described above in connection with FIG. 2, and the following Table IV indicates the analysis of the initial oxidised filtrate (5), of the filtrate after concentration (8), of the concentrated filtrate after the second stage (9) of placing into contact with tributyl phosphate, of the filtrate freed of iron (11) and of the ferric eluate (13), that is to say of the ferric chloride solution obtained after the regeneration stage (12).

TABLE IV

|  | Ni g/l | Fe g/l | Cr g/l | Co g/l | $H^+$ (N) |
| --- | --- | --- | --- | --- | --- |
| Oxidised filtrate (5) | 37 | 115 | — | — | 0.4 |
| Filtrate after 1st stage (7) and concentration (8) | 113 | 126 | — | — | 0.28 |
| Filtrate after 2nd stage (9) | 113 | 46.7 | — | — | 0.18 |
| Ferric eluate (13) | 0.26 | 110 | 0.02 | 0.012 | — |

The nickel yield is greater than 99.3% although the organic phase is not washed at the outlet of stage 9, and also the efficiency of iron extraction is equal to 99.94%.

The removal of the cobalt (14), carried out by means of triisooctylamine diluted in an aromatic solvent, takes place in 5 stages with a volume ratio between the organic phase and the aqueous phase (O/A) of 0.75. The washing of the organic phase and its regeneration with the help of a decinormal hydrochloric solution take place in the 2nd and 6th stages respectively, with O/A ratios of 200 and 8.5 respectively.

The following Table V shows the nickel, cobalt and $H^+$ ion contents of the filtrate immediately before being freed of cobalt (11), and immediately after being freed of cobalt (15), and of the cobalt eluate, that is to say of the cobalt chloride solution obtained by regeneration of the triisooctylamine.

TABLE V

|  | Ni g/l | Co g/l | $H^+$ (N) |
| --- | --- | --- | --- |
| Solution before being freed of cobalt (11) | 150 | 4.27 | 0.15 |
| Solution freed of cobalt (15) | 150 | <0.004 | 0.21 |
| Cobalt eluate | 0.016 | 51.7 | 0.14 |

The extraction (16) of the chromium will now be described with reference to experiments using not the solution 15 but using instead a synthetic solution containing 100 g/l of nickel and 7 g/l of chromium and of PH 3.

The operating conditions are indicated below, the volume of each of the solutions being expressed in terms of V, the volume of the solution to be treated. Thus, for a given solution or phase the indication 2 V, for example, means that two volumes of this solution or of this phase are required for treating one volume of the solution to be treated which enters the plant and, in the case of continuous operation, that the flow rate of this solution or of this phase should be twice the flow of the solution to be treated.

Number of extraction stages (16 - FIG. 3): 16
Number of washing stages (21 - FIG. 3): 16
Number of re-extraction stages (20 - FIG. 3): 8
Volume of the organic extraction phase (EHPA): 1.7V
HCl concentration of the washing solution (21): 0.44N
Volume of washing solution (21): 0.2V
HCl concentration of re-extraction solution (20): 6N
Volume of re-extraction solution (20): 0.34N
$Na_2CO_3$ concentration of salification solution (18): 1M
Volume of Na displacement solution (19): 0.157V The results obtained are summarized in the following Table:

|  | Cr (g/l) | Ni (g/l) |
| --- | --- | --- |
| Purified aqueous solution (17) | 0.00015 | 105 |
| Aqueous phase leaving re-extraction (20) | 20 | 1 |
| EHPA after washing (21) | 4 | 0.08 |
| EHPA after re-extraction (20) | 0.080 | 0.00016 |

It is found that the chromium was perfectly eliminated from the aqueous solution to be treated and that it was readily extracted again from the organic treatment phase.

In a second experiment only 10 extraction stages and 6 washing stages were used, but the reagent contained in the organic phase (EHPA) was partly in the form of a nickel salt and partly in acid form.

For the extraction and the washing the conditions were as follows:

Volume of the organic reagent as nickel salt: 1.5V
Volume of the reagent in acid form: 0.4V
HCl concentration of the organic washing phase: 0.4N
Volume of aqueous washing phase: 0.15V Under these conditions the following results were obtained:

|  | Cr (g/l) | Ni (g/l) |
| --- | --- | --- |
| Purified aqueous solution (17) | 0.0001 | 106.25 |
| EHPA after washing (21) | 4.525 | 1.010 |

We conclude the number of extraction and washing stages can be reduced on conditions that the form in which the organic extraction reagent is introduced is at least partially modified.

In a third experiment only 8 extraction stages were used and 8 washing stages, but the acidity of the hydrochloric washing solution was raised to 0.5 N with a volume of 0.2V. 1.5 V of the organic reagent was introduced, prior to the first extraction stage, in the form of nickel salt, whilst 0.3 V of this reagent was introduced in acid form at the fifth stage.

The results obtained are as follows:

|  | Cr (g/l) | Ni (g/l) |
|---|---|---|
| Purified aqueous solution (17) | <0.0001 | 110.5 |
| EHPA after washing (21) | 3.53 | 0.325 |

Thus it may be of interest to raise the acidity and the flow of the hydrochloric washing solution, but practitioners will be able to determine, for their particular requirements, an adequate compromise between the values of the differnt parameters available. Likewise, although the first experiment apparently gives better results than the second, its practical application necessitates a larger plant as well as a larger consumption of the basic reagent for salifying the solvent. Thus, practitioners must also choose a compromise between better selectivity and lower production cost.

The result of the various stages of the process described above is a combination of four pure solutions:
a solution (17) of nickel chloride,
a ferric eluate (13)
a cobaltic eluate and
a chromic eluate (20)

We will now describe how pure iron can be obtained from the ferric eluate, since how the other metals may be obtained has already been described elsewhere, for example in our British Patent Specification No. 1,385,263.

The ferric eluate (13) is subjected in the first place to an electrolytic reduction (25) intended to convert the ferric ions contained in the solution to the ferrous state. The operating conditions are given in Table VI below:

TABLE VI

| | |
|---|---|
| Anode | graphite + membrane |
| Cathode | titanium |
| Current density | 12 A/dm$^2$ |
| Terminal voltage | 3.1 to 4.1 V |
| Temperature | 70° C |
| pH | 0.5 |
| Bath composition | |
| Total content of Fe ions | 150 g/l |
| Initial content of Fe$^{3+}$ ions | 150 g/l |
| Fe$^{2+}$/total Fe after reduction | 84% |
| Cathode efficiency of the reduction Fe$^{3+}$ to Fe$^{2+}$ | 80% |
| Chlorine recovery efficiency | 80% |

The solution so obtained, containing substantially ferrous ions, is then subjected to an electrolysis (26) which produces pure iron (27) on the cathode. The operating conditions of this final electrolysis are as follows:

TABLE VII

| | |
|---|---|
| Current density | 6 A/dm$^2$ |
| Voltage | 3 to 5.8 V |
| Temperature | 90° C |
| pH | 1.10 |
| Cathode efficiency | 93% |
| Electrolyzed solution | |
| Total Fe at 98% Fe$^{2+}$ | 120 g/l |

Regeneration by 85% Fe$^{2+}$ $^{solution}$.

It can be seen that the above provides a complete process for obtaining from ferro-nickel the following metals in pure state: nickel, iron, cobalt, chromium.

The extraction of these metals from the various chloride solutions obtained may of course be realized in several different manners, or the solutions may be sold or converted into other valuable form, yielding any of various forms, e.g. pure metals in the form of cathodes or of powder, alloys, or crystallised salts. In particular the iron can readily be marketed in the form of ferric chloride used for water treatment.

Supplementary stages may be inserted as necessary in order to eliminate other impurities contained in the solution resulting from the attack 1 on the ferro-nickel. Moreover, the specified organic reagents may be replaced by others or by equivalent ion-exchange resins.

What we claim is:

1. A hydrometallurgical treatment process for extracting constituent metal values from ferro-nickel containing cobalt, comprising the following steps:
    a. treating said ferro-nickel with chlorine in an aqueous medium and filtering the resultant matter;
    b. oxidising said filtrate;
    c. removing the iron contained in said oxidised filtrate by liquid/liguid extraction using an organic extractant (i) containing tributyl phosphate and regenerating said organic extractant (i) using an aqueous stripping solution (ii) thus yielding a pure aqueous solution of ferric chloride; and
    d. removing the cobalt contained in said oxidised filtrate by liquid/liquid extraction using an organic extractant (iii) containing a tertiary amine and regenerating said organic extractant (iii) using an aqueous stripping solution (iv) thus yielding a pure aqueous solution of cobalt cloride, the chloride, oxidised filtrate comprising a solution of nickel chloride.

2. The hydrometallurgical treatment process as claimed in claim 1, and further comprising:
    f. treating at least one of said solutions of ferric chloride, cobalt chloride, and nickel chloride to obtain the corresponding metal in elemental or other valuable form.

3. The hydrometallurgical treatment process as claimed in claim 2, wherein said treatment step (f) comprises an electrolysis treatment.

4. The hydrometallurgical treatment process as claimed in claim 3, wherein the chlorine liberated in said electrolysis is recycled to the treatment step (a).

5. The hydrometallurgical treatment process as claimed in claim 3, wherein said solution of ferric chloride is subjected to a first electrolysis to convert at least part of said ferric chloride to ferrous chloride, and subsequently to a second electrolysis yielding metallic iron.

6. The hydrometallurgical treatment process as claimed in claim 3, wherein each solution subjected to electrolysis has a pH of from 3 to 4.

7. The hydrometallurgical treatment process as claimed in claim 1, wherein said treatment step (a) is conducted at a temperature of from 70° to 110° C, the quantity of chlorine used being from 1.0 to 1.1 times the stoichiometric amount required.

8. The hydrometallurgical treatment process claimed in claim 1, wherein said oxidation step (b) also includes acidification of the oxidised filtrate to an acidity of 0.1 to 0.5N.

9. The hydrometallurgical treatment process as claimed in claim 1, wherein said removal step (c) of said iron comprises the following stages in succession:
    1. contacting said oxidised filtrate from the oxidation step (b) with said organic extractant (i);

2. concentrating the extracted filtrate resulting from said contacting step (1);
3. contacting said concentrated extracted filtrate from said concentration step (2) with said organic extractant (i) resulting from said contacting step (1);
4. regenerating said organic extractant (i) resulting from said contacting step (3) using said aqueous stripping solution (ii) comprising water or acidified water;
5. contacting said concentrated extracted filtrate from said contacting step (3) with said regenerated organic extractant (i) from said regeneration step (4); and
6. recycling said organic extractant (i) to the contacting step (1).

10. The hydrometallurgical treatment process as claimed in claim 1, wherein said oxidised filtrate after removal of said iron in step (c) contains at least 5 moles/liter of chloride ions.

11. The hydrometallurigical treatment process as claimed in claim 1 wherein said tertiary amine contained in said organic extractant (iii) is triisooctylamine.

12. A hydrometallurgical treatment process for extracting constituent metal values from ferro-nickel containing cobalt and chromium, comprising the following steps:
  a. treating said ferro-nickel with chlorine in an aqueous medium and filtering the resultant matter;
  b. oxidising said filtrate;
  c. removing the iron contained in said oxidised filtrate by liquid/liquid extraction using an organic extractant (i) containing tributyl phosphate and regenerating said organic extractant (i) using an aqueous stripping solution (ii) thus yielding a pure aqueous of ferric chloride;
  d. removing the cobalt contained in said oxidised filtrate by liquid/liquid extraction using an organic extractant (iii) containing a tertiary amine and regenerating said organic extractant (iii) using an aqueous stripping solution (iv) thus yielding a pure aqueous solution of cobalt chloride; and
  e. removing the chromium contained in said oxidised filtrate by liquid/liquid extraction using an organic extractant (v) containing an alkylphosphoric acid and regenerating said organic extractant (v) using an aqueous stripping solution (vi) thus yielding a pure aqueous solution of chromium chloride, the resultant oxidised filtrate comprising a solution of nickel chloride.

13. The hydrometallurgical treatment process as claimed in claim 12, and further comprising:
  f. treating at least one of said solutions of ferric chloride, cobalt chloride, chromium chloride and nickel chloride to obtain the corresponding metal in elemental or other valuable form.

14. The hydrometallurgical treatment process as claimed in claim 13, wherein said treatment step (f) comprises an electrolysis treatment.

15. The hydrometallurgical treatment process as claimed in claim 14, wherein the chlorine liberated in said electrolysis is recycled to the treatment step (a).

16. The hydrometallurgical treatment process as claimed in claim 14, wherein said solution of ferric chloride is subjected to a first electrolysis to convert at least part of said ferric chloride to ferrous chloride, and subsequently to a second electrolysis yielding metallic iron.

17. The hydrometallurgical treatment process as claimed in claim 14, wherein each solution subjected to electrolysis has a pH of from 3 to 4.

18. The hydrometallurgical treatment process as claimed in claim 14, wherein said oxidised filtrate resulting from said removal step (d) contains more than 5 parts per million of chromium and wherein said removal step (c) of said chromium is performed prior to said electrolytic treatment (f) of the nickel chloride solution.

19. The hydrometallurgical treatment process as claimed in claim 12, wherein said removal step (e) of said chromium comprises the following stages:
  1. contacting said oxidised filtrate with said organic extractant (v);
  2. washing said organic extractant (v) with acidified water;
  3. stripping said chromium contained in said organic extractant (v) with said aqueous stripping solution (vi) comprising concentrated hydrochloric acid;
  4. treating said organic extractant (v) with a basic agent; and
  5. contacting said organic extractant (v) with a solution of nickel chloride.

20. The hydrometallurgical treatment process as claimed in claim 19, wherein said acidified water used for said washing of said organic extractant (v) has an acidity of from 0.1 to 1 N.

21. The hydrometallurgical treatment process as claimed in claim 12, wherein said treatment step (a) is conducted at a temperature of from 70° to 110° C, the quantity of chlorine used being from 1.0 to 1.1 times the stoichiometric amount required.

22. The hydrometallurgical treatment process as claimed in claim 12, wherein at least two-thirds of said alkylphosphoric acid contained in the organic extractant (v) is in the form of its nickel salt.

* * * * *

UNITED STATES PATENT AND TRADEMARK OFFICE
CERTIFICATE OF CORRECTION

PATENT NO. : 4,016,054
DATED : April 5, 1977
INVENTOR(S) : Louis GANDON et al

It is certified that error appears in the above-identified patent and that said Letters Patent are hereby corrected as shown below:

Claim 1, paragraph (d), third line from end, delete "cloride", insert --chloride--;
delete "chloride", insert -- resultant --.

*Signed and Sealed this*

*Tenth* Day of *July 1979*

[SEAL]

*Attest:*

LUTRELLE F. PARKER
*Attesting Officer*     *Acting Commissioner of Patents and Trademarks*